July 21, 1964 W. T. SELSTED ETAL 3,141,593

CAPSTAN CONSTRUCTION

Filed Dec. 8, 1958

INVENTORS
Walter T. Selsted
Joseph A. Dinsmore
BY
Flehr & Swain
ATTORNEYS

United States Patent Office 3,141,593
Patented July 21, 1964

3,141,593
CAPSTAN CONSTRUCTION

Walter T. Selsted, Redwood City, and Joseph A. Dinsmore, San Carlos, Calif., assignors to Ampex Corporation, Redwood City, Calif., a corporation of California
Filed Dec. 8, 1958, Ser. No. 778,947
4 Claims. (Cl. 226—193)

This invention relates generally to magnetic tape recording and/or reproducing machines, and particularly to the construction of the capstan for driving the tape.

Conventional machines of the above character employ a magnetic tape consisting of a ribbon formed of suitable plastic material, such as cellulose acetate or Mylar, having a coating of iron oxide or like magnetic material on one side of the same. The tape is driven at a constant speed past the magnetic recording and reproducing head, by means of a so-called driving capstan. In typical instances the capstan may range from 1/4 to 3/8 of an inch in diameter, and is formed of hard steel or steel alloy, with a polished surface. A suitable clamping idler, urged by a spring or solenoid, serves to press or clamp the uncoated side of the tape against the capstan surface. Suitable means is employed in conjunction with the supply reel turntable to maintain tension upon the tape as it is being drawn by the capstan past the magnetic head. Such tape driving means has been subject to difficulties, particularly where the performance requirements are exacting. For example, for high fidelity reproduction of sound there is a tendency toward flutter effects which we have found is due largely to a slight amount of slippage between the capstan and the surface of the tape. While an increase in clamping pressure may tend to reduce slippage, this of itself is not a practical solution, and may cause mechanical difficulties.

In general it is an object of the present invention to provide a tape driving capstan for a magnetic tape machine which will eliminate troublesome slippage.

Another object of the invention is to provide an improved tape driving capstan which is relatively simple to manufacture, and which is compatible with other parts of conventional magnetic tape machines.

Additional objects and features of the invention will appear from the following description in which the preferred embodiment has been set forth in detail in conjunction with the accompanying drawing.

Referring to the drawing.

In accordance with the present invention, the driving capstan is formed with a particular type of surface irregularity, to make possible tape driving operations without slippage, and without injury to the pliable material of which the tape is formed. More specifically, the surface of the capstan is sand blasted to provide a great number of relatively sharp projections distributed over the entire area of the capstan surface.

Figure 1:
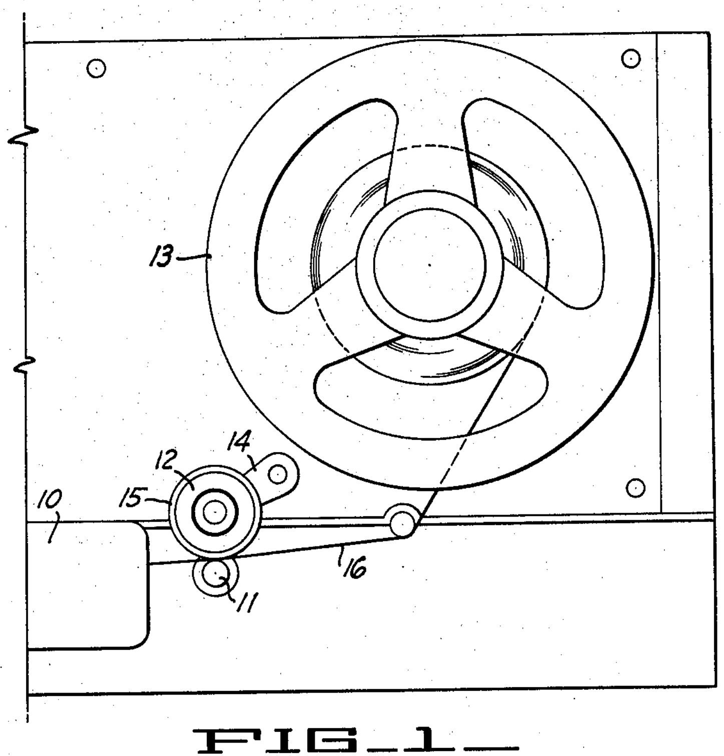
FIGURE 1 is a plan view illustrating a tape driving capstan and associated parts.

FIGURE 1 illustrates part of a magnetic tape machine, including the magnetic head assembly 10, the driving capstan 11 and its idler 12, and the takeup reel 13. Another supply reel (not shown) carries the tape being fed past the magnetic head. As is well known to those familiar with magnetic tape machines, the magnetic head 10 in a typical instance may include erase, record and reproducing head units. The tape clamping idler is carried by the pivoted arm 14, and during normal operations the machine is urged by a spring or solenoid means to press the tape against the periphery of the driving capstan 11. The driving capstan is driven by a suitable motor at a constant speed. The idler is retracted from the tape during fast forward or rewind operations. Generally the idler 12 is provided with a resilient surface 15 formed of suitable material such as resilient natural or synthetic rubber. Its width is generally somewhat greater than that of the tape, as shown in FIGURE 2, whereby when pressed against the capstan, the medial portion of the idler surface engages the tape 16, and marginal portions directly engage the capstan.

Figure 2:
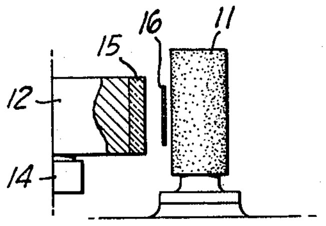
FIGURE 2 is a schematic view on an enlarged scale illustrating a tape driving capstan made in accordance with the present invention, together with a magnetic tape and idler.
Figure 3:
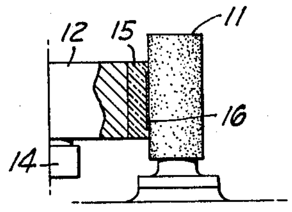
FIGURE 3 is a view like FIGURE 2 but showing the tape being pressed against the capstan driving surface.

In accordance with the present invention, the surface of the capstan 11 is made with a particular type of surface irregularity, represented by stippling in FIGURES 2 and 3. The surface irregularity is formed by a suitable sand blasting operation, which is carried out as a final manufacturing operation. Thus it is satisfactory to first finish the capstan by grinding or application of other conventional surface finishing methods, taking care to bring the surface to the desired driving diameter. Thereafter the capstan is subjected to a sand blasting operation.

Sand blasting can be carried out by the use of conventional pneumatic sand blasting nozzles, care being taken to rotate the capstans being blasted in order to distribute the effect uniformly over the entire surface. The grits should be selected in accordance with the character of the surfacing desired. At the commencement of a sand blasting operation the pelting of the hard metal surface with the sand granules causes surface indentation, with raising of intervening projections slightly beyond the driving diameter. We continue the sand blasting until the height of the raised projections is reduced to correspond with that of the previously finished surface.

We have discovered that the depth of indentation due to the pelting action of the sand grits and the number of the projections per unit area should be such as to provide a surface finish ranging from about 20 to 40 microinch. The projection between the indentations are relatively sharp, and terminate on the desired driving diameter. For this range the number of projections per unit area will be of the order of from 2,000,000 to 10,000,000 per square inch area. Although the projections are unevenly spaced apart, in general they are distributed over the entire area, in the manner characteristic of a sand blasted surface.

When our improved capstan is substituted for one of conventional construction, all slippage between the capstan and the tape is completely eliminated. The relatively sharp projections impress themselves a slight amount into the smooth plastic surface of the tape, to establish positive drive relation. Although the projections appear to impress themselves into the plastic surfacing, no deterioration of the tape occurs, which is attributed to the fact that the indentation into the plastic surface by each projection is insufficient to cause any permanent impediment or deformation. In other words, there is immediate recovery of the plastic material from such indenting action.

In view of the foregoing explanation, it will be apparent that the tape is driven on the diameter corresponding to the outer ends of the indentations, and the plastic surface of the tape may or may not touch the depressed metal surfaces between the projections.

Beyond the stated limit of about 20 microinch, as for example, 15 microinch or finer, objectionable slippage tends to occur. Beyond the limit of about 40 microinch, the surfacing is subject to accumulation of iron oxide from the tape. Although the side of the tape which contacts the capstan is uncoated, clusters of magnetic iron oxide particles tend to find their way upon the back side of the tape, and with coarser capstan finishes ranging up to, say, 200 microinch, such clusters tend to be jammed in the indentation whereby the character of the surface is gradually changed with increased tendency toward slippage. Surface finishes of the order of 200 microinch or coarser are such that for normal clamping pressures, the tape is permanently indented and deformed.

Contrary to what might be expected, it has been found that capstans made according to our invention have a long, useful life. Apparently there is little, if any, actual wear of the projections upon which the tape rides.

Previous reference has been made to the fact that conventional capstans are carefully machined and finished to provide relatively smooth surfaces. For example, it has been common practice to subject a capstan to a hardening operation, after which they are subjected to final finishing to produce a finish of the order of 8 microinch. Such manufacturing methods are relatively expensive. With the present invention it is unnecessary to start with a surface finish of the order of 8 microinch. It is feasible, for example, to start with poor finish of the order of 16 microinch, and then apply sand blasting in the manner previously described. The final finish can then be made of the order of 20 to 40 microinch. In the sand blasting operation the undesired characteristics of the previous finish are eliminated.

This application is a continuation-in-part of our copending application Serial No. 541,687, filed October 20, 1955, now abandoned, for "Capstan Construction."

We claim:

1. In combination with a pinch roller and a magnetic tape of the class having magnetic particles affixed thereto: a capstan provided with a roughened tape-engaging surface the raised portions of which terminate at a predetermined cylindrical surface and are spaced apart for a dimension less than the size of the smallest of said particles, whereby the roughness of said capstan surface is preserved against the tendency of said particles to become detached from said tape and to become embedded between said raised portions.

2. In combination with a pinch roller and a magnetic tape of the class having magnetic particles affixed thereto: a capstan provided with a roughened tape-engaging surface the raised portions of which terminate at a predetermined cylindrical surface and are dimensioned to provide tractional gripping of said tape without permanent deformation thereof when said tape is clamped between said capstan and said pinch roller, said raised portions being spaced apart for a dimension less than the size of the smallest of said particles, whereby the roughness of said capstan surface is preserved against the tendency of said particles to become detached from said tape and to become embedded between said raised portions.

3. In combination with a pinch roller and a magnetic tape of the class having affixed thereto a plurality of magnetic particles having maximum dimensions in the range of 1–5 microns: a capstan provided with a roughened tape-engaging surface the raised portions of which terminate at a predetermined cylindrical surface and are dimensioned to have heights in the range of ½–1 microns so as to provide tractional gripping of said tape without permanent deformation thereof when said tape is clamped between said capstan and said pinch roller, said raised portions being spaced apart for a dimension less than 1 micron, whereby the roughness of said capstan surface is preserved against the tendency of said particles to become detached from said tape and to become embedded between said raised portions.

4. In the structure of a rotary member for rolling pressure engagement with a recording tape to control the travel thereof, the improvement comprising a peripheral surface of hard wear-resistant material on said rotary member with a distribution of microscopic craters in said peripheral surface of high density to provide a minutely uneven surface finish for engagement with the tape, said surface finish being in the range of 20 to 30 microinch rms.

References Cited in the file of this patent

UNITED STATES PATENTS

| | | |
|---|---|---|
| 1,270,836 | Johnson | July 2, 1918 |
| 1,743,623 | Ross | Jan. 14, 1930 |
| 1,810,636 | Adler | June 16, 1931 |
| 2,024,007 | McColloch | Dec. 10, 1935 |
| 2,523,387 | Natzke | Sept. 26, 1950 |
| 2,548,981 | Kemp | Apr. 17, 1951 |
| 2,561,761 | Tempe | July 24, 1951 |
| 2,586,011 | Doelter | Feb. 19, 1952 |
| 2,600,358 | Bolton et al. | June 10, 1952 |
| 2,660,380 | Blackman | Nov. 24, 1953 |
| 2,704,639 | Shields | Mar. 22, 1955 |
| 2,721,076 | Baker | Oct. 18, 1955 |
| 2,781,849 | Bladergroen et al. | Feb. 19, 1957 |
| 2,892,628 | Zeigle | June 30, 1959 |